United States Patent Office 3,829,481
Patented Aug. 13, 1974

3,829,481
PROCESS FOR PREPARING A THIODIACYL
HALIDE
Joel M. Kauffman, Sharon, Mass., assignor to I.C.I.
America, Inc., Stamford, Conn.
No Drawing. Filed Mar. 12, 1969, Ser. No. 806,729
Int. Cl. C07c 51/58
U.S. Cl. 260—544 Y        4 Claims

ABSTRACT OF THE DISCLOSURE

A process for preparing a thiodiacyl halide in a readily recoverable form by reacting together phosphorus trihalide and a thiodicarboxylic acid. The process can be used to prepare thiodipropionyl chloride from thiodipropionic acid.

---

The present invention is concerned with an improved process for the preparation of thiodiacyl halides, e.g. thiodipropionyl chloride.

The preparation of thiodipropionyl chloride using purified thiodipropionic acid and thionyl chloride has been reported by H. Schmid and E. Schnetzler, Helv. Chim. Acta 34, 894–7 (1951). However, attempts to repeat this process have only given a low yield of the desired thiodipropionyl chloride. Particular difficulty has been encountered in attempting to isolate the product. For example, distillation results in undesired resinification.

The principal object of the present invention is to provide a process for preparing thiodipropionyl chloride and like thiodiacyl halides in good yield. Another object is to provide such a process wherein the thiodiacyl halide may be conveniently recovered from the reaction mixture. Other objects will also be hereinafter apparent.

Broadly stated, the objects of the invention are realized by the provision of a process for preparing thiodiacyl halides which comprises reacting phosphorus trihalide with thiodicarboxylic acid until the reaction is completed. The desired reaction product is then advantageously extracted from the reaction mixture, which includes phosphoric acid by-product and possibly some unreacted starting material, by using a solvent for the thiodiacyl halide which is immiscible with phosphoric acid and forms two readily separable layers, an upper layer comprising a solution of the thiodiacyl halide in the extraction solvent and a bottom layer comprising the phosphoric acid by-product. Benzene is an especially preferred solvent for extracting the thiodiacyl halide from the reaction mixture although other inert hydrocarbon solvents for the desired product, e.g. toluene and xylene, in which phosphoric acid is insolvent, may be used for present purposes. Actually any inert solvent for the acyl chloride which is less dense than phosphorous acid may be used. This includes such materials as the alkanes; cycloalkanes, e.g., cyclohexane; chlorinated alkanes or alkenes; ether, cycloethers and esters.

Advantageously the reaction is carried out in the liquid phase at atmospheric pressure and elevated temperature (e.g., 60–90° C., preferably at around 80° C.) for reaction times in the order of 30 minutes to 2 hours although other operating conditions, including ambient temperature at longer reaction times, and/or superatmospheric pressure may also be used provided the liquid phase is maintained. The reaction may be carried out in the presence of an appropriate inert diluent or solvent such as benzene, toluene, xylene or cyclohexane, although good results are obtained without such reaction medium, the reaction mixture tending to separate out, on standing after completion of the reaction, into two liquid layers, a top layer containing the desired product and the bottom layer containing by-product phosphoric acid.

The relative proportions of the reactants can be varied. Stoichiometric amounts are preferred, although an excess of one or the other reactant up to, for example, 50% by weight can be tolerated.

Preferably the phosphorus trichloride is employed as the phosphorus trihalide reactant, although phosphorus tribromide, phosphorus triiodide or phosphorus trifluoride may also be used effectively. As for the thiodicarboxylic acid reactant, thiodipropionic acid is preferred, although thiodibutyric acid or, in fact, any thiodicarboxylic acid of the formula:

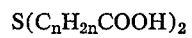

where $n$ is an integer, may be used. Usually the value of $n$ will not exceed 9 but higher values up to, for example, 18–20, as in the case of thiocarboxylic acids based on, for example, undecylenic acid ($n=10$) or oleic acid ($n=17$) may be effectively employed. It will be appreciated that the $C_nH_{2n}$ substituent may be straight chain or branched as desired.

The reaction involved, using thiodipropionic and phosphorus trichloride as the reactants, may be represented as follows:

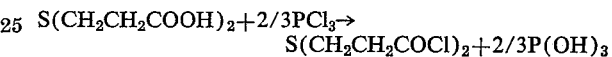

As noted earlier, the indicated reaction products separate into two liquid layers. Extraction of the upper layer with benzene or the equivalent gives a colorless solution which contains essentially all of the thiodipropionyl chloride formed (yield: about 75–95%).

The invention is illustrated, but not limited, by the following examples:

Example 1

A 500 ml. flask equipped with magnetic stirrer and reflux condenser was charged with 160 g. (0.9 mole) of commercial thiodipropionic acid and 52 ml. (82 g., 0.6 mole) technical phosphorus trichloride, and heated in an oil bath at 80±5° C. The mixture liquified after about 20 minutes, then magnetic stirring was begun and heating was continued for one hour. After removal of the hot oil bath, 228 ml. (200 g.) of benzene was added through the condenser. Stirring was maintained for 5 minutes, then the benzene solution was decanted from the viscous layer of phosphorous acid, through a glass wool filter, with exclusion of air, into a tared bottle. The yield of product (in solution) was 155 g. (80%), and the solution concentration was about 44%. Storage in a sealed bottle at 20° C. for two days led to separation of a few grams of white solid, presumed to be unreacted thiodipropionic acid. Analysis of the colorless supernatant liquid was as follows:

Percent P: Calc., 0.0. Found, 0.0. Percent Cl: Calc., 14.5. Found, 13.0.

Example 2

Dropwise addition of 10 ml. of the product of example 1 to a mixture of 50 ml. of isopropyl alcohol and 6 ml. of ammonium hydroxide (S. G. 0.090) at 5–10° gave a white solid which was collected, washed well with cold water and dried, to give 2.2 g. m.p. 172–174° C. Two recrystallizations from water raised the m.p. to 179–181° C.

Example 3

The procedure of Example 1 was followed using thiodibutyric acid instead of thiodipropionic acid; an oil bath temperature of 65±5° C.; and heating time of one half hour after liquefaction.

The yield of crude thiodibutyryl chloride (in solution) was 93%, and the solution concentration was about 46%.

Example 4

Dropwise addition of 10 ml. of the product of Example 3 to 50 ml. of ammonium hydroxide (S.G. 0.090), with ice cooling, gave a white solid (0.9 g., m.p. 148–150° C.) which was recrystallized from 25 ml. of water. The m.p. was then 152–153° C.

Infrared absorption at 3400, 3200, 2850, 1650, and 1405 cm.$^{-1}$ supports the structure.

Analysis: Percent N: Calc., 13.7. Found, 14.2. Percent S: Calc., 15.7. Found, 14.3.

It will be appreciated that various modifications may be made in the invention described above. The products thus obtained, e.g., thiodipropionyl chloride, may be used as intermediates in the preparation of thioesters such as dilauryl thiodipropionate or thiodibutyrate or the corresponding distearyl derivatives, which are useful to stabilize polyolefins against heat, oxygen and/or light decomposition. The present product may also be employed as intermediates for other useful esters which cannot, unlike dilaurylthiodipropionate and distearylthiodipropionate and the dibutyrates, be made by normal (Fischer) esterification procedures such as:

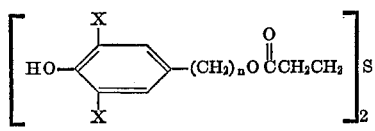

and

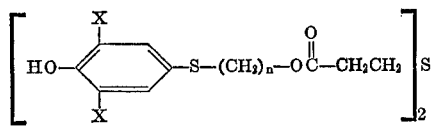

The scope of the invention is defined in the following claims wherein:

I claim:

1. A process for preparing a thiodiacyl halide which comprises reacting a phosphorus trihalide with a thiodicarboxylic acid of the formula:

$$S(C_nH_{2n}COOH)_2$$

wherein $n$ is an integer up to 9, to give the corresponding thiodiacyl halide $S(C_nH_{2n}COX)_2$ where X is halogen, allowing the reaction mixture to separate into two phases, an upper phase containing the thiodiacyl halide and a lower phase containing phosphoric acid by-product and recovering the thiodiacyl halide from said upper layer by extracting with an inert solvent for the halide which is less dense than the phosphoric acid and in which the acid is insoluble.

2. The process of claim 1 wherein phosphorus trichloride and thiodipropionic acid are the reactants.

3. The process of claim 1 wherein stoichiometric amounts of said reactants are employed.

4. The process of claim 1 wherein the solvent is benzene.

References Cited

UNITED STATES PATENTS

| | | | |
|---|---|---|---|
| 2,034,850 | 3/1936 | Whitmore | 260—123 |
| 2,908,710 | 10/1959 | McBee | 260—481 |

OTHER REFERENCES

Schmid et al.: *Helv. Chimica Acta.* 34, p. 894–7 (1951).

LORRAINE A. WEINBERGER, Primary Examiner

R. D. KELLY, Assistant Examiner

U.S. Cl. X.R.

260—481 R